Nov. 8, 1949     G. S. STRATTON     2,487,680
FILM CARTRIDGE FOR EXPOSING AND DEVELOPING

Filed Feb. 20, 1947     2 Sheets—Sheet 1

INVENTOR.
GLEN S. STRATTON
BY Frederick E. Hans
ATTORNEY

Nov. 8, 1949 G. S. STRATTON 2,487,680
FILM CARTRIDGE FOR EXPOSING AND DEVELOPING
Filed Feb. 20, 1947 2 Sheets-Sheet 2
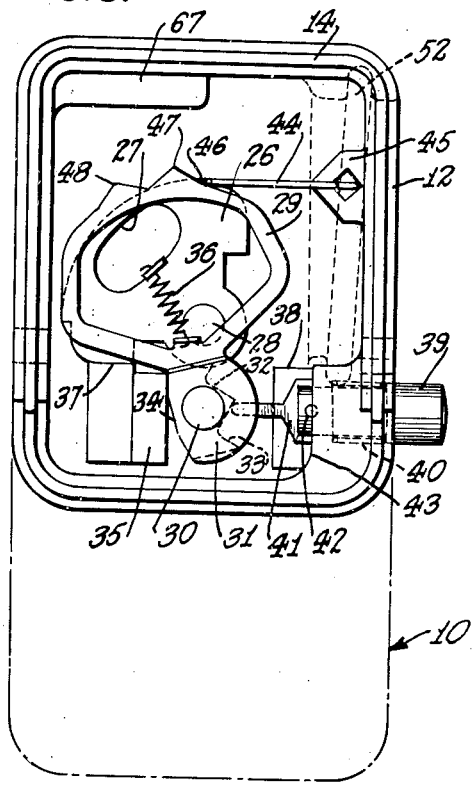
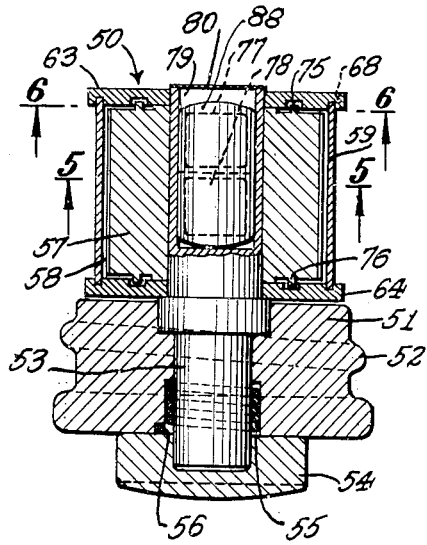
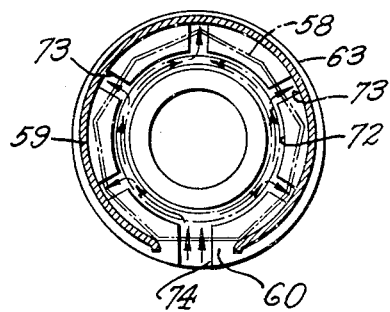
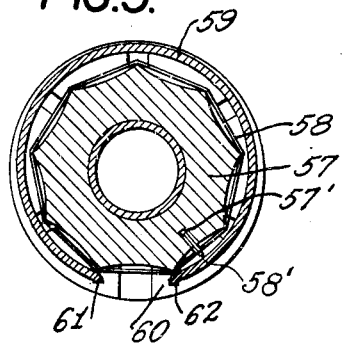
INVENTOR.
GLEN S. STRATTON
BY
ATTORNEY Patented Nov. 8, 1949

2,487,680

UNITED STATES PATENT OFFICE 2,487,680

FILM CARTRIDGE FOR EXPOSING AND DEVELOPING

Glen S. Stratton, New York, N. Y.

Application February 20, 1947, Serial No. 729,733

10 Claims. (Cl. 95—70)

1

This invention relates to photographic apparatus, and particularly to cartridges for use in connection with photographic apparatus.

One object of the invention is a novel and improved carrier for a sensitized layer such as a film, a plate or print paper.

Another allied object of the invention is a novel and improved carrier for the sensitized layer which permits to bring the said layer in contact with development solutions without requiring the use of a dark room.

Another allied object of the invention is a novel and improved carrier which is designed to support a supply of the sensitized layer and to move successive portions of the said layer into a position for exposure, thereby permitting to make a plurality of exposures by means of a single carrier.

Another allied object of the invention is a novel and improved carrier which can be inserted into the camera for the purpose of making exposures and be withdrawn therefrom for immersion in development solutions without requiring any preparation or manipulation of the carrier.

Another allied object of the invention is a carrier for the sensitized layer in the shape of a cartridge which is received by corresponding openings in the camera casing for making the intended exposures and for bringing exposed portions of the sensitized layer in contact with developing solutions provided either in the camera proper or in a developing tank and when it is desired to develop the sensitized layer outside of the camera.

The invention is particularly useful in connection with miniature cameras but is also applicable to cameras of a larger size. The invention is further useful in application to photographic apparatus for making enlargements, positive prints, etc.

Other and further objects, features and advantages of the invention will appear hereinafter and be pointed out in the appended claims forming part of the application.

In the accompanying drawings a now preferred embodiment of the invention is shown by way of illustration and not by way of limitation.

In the drawings:

Fig. 3 is a front view of the part of the camera

Figure 1:
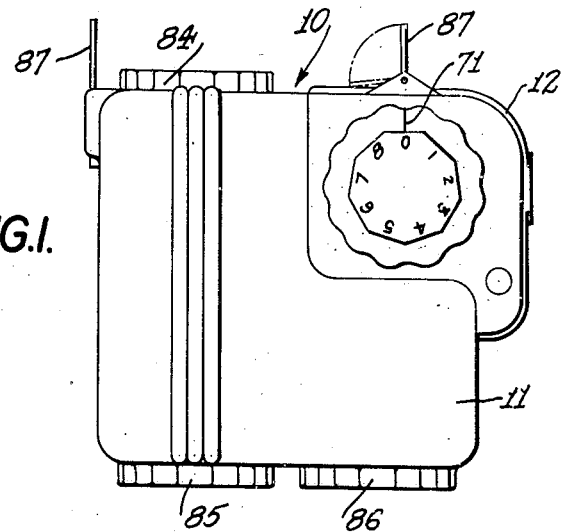
Fig. 1 is an elevational side view of photographic camera according to the invention.

2 casing containing the optical elements of the camera.

Fig. 4 is a sectional view of the cartridge supporting the sensitized layer.

Fig. 5 is a section along 5—5 of Fig. 4, and

Fig. 6 is a section along line 6—6 of Fig. 4.

Referring now to the figures in detail, the camera used with this invention comprises a casing, generally designated by 10. The casing has preferably a substantially rectangular shape and is made of any suitable material such as a plastic. According to a now preferred embodiment, the casing is composed of two halves 11, one of them being shown in Fig. 2, and an additional section 12 which contains the optical parts of the camera, or in other words, constitutes the camera proper. Halves 11 are permanently joined by any suitable means such as gluing or cementing. A tongue 13 on one half interlocking with a corresponding groove in the other half of the casing is preferably provided to secure the casing halves to each other and to constitute a liquid tight seal. Casing section 12 is similarly secured to the other portion of the casing by a tongue 14 engaging a corresponding groove, in sections 11. Additional locating pins 15 and 15′ engaging corresponding recesses in the opposite half of the casing may be provided to secure the halves of the camera casing to each other.

The camera casing is subdivided by partition walls 16, 17, 18 and 19 to form three chambers or compartments 20, 21, 22 completely closed one against the other and against section 12.

Casing section 12 has an opening 23 which serves to receive the camera lens 24 secured in opening 23 by a frame 25 or any other suitable means.

The inner wall of section 12, opposite to lens 24 supports the camera shutter.

It should be noted in this connection that the design of the lens system and the construction of the shutter do not constitute an essential part of the invention and that any suitable lens system and shutter construction, conventional or otherwise, may be employed.

Figure 2:
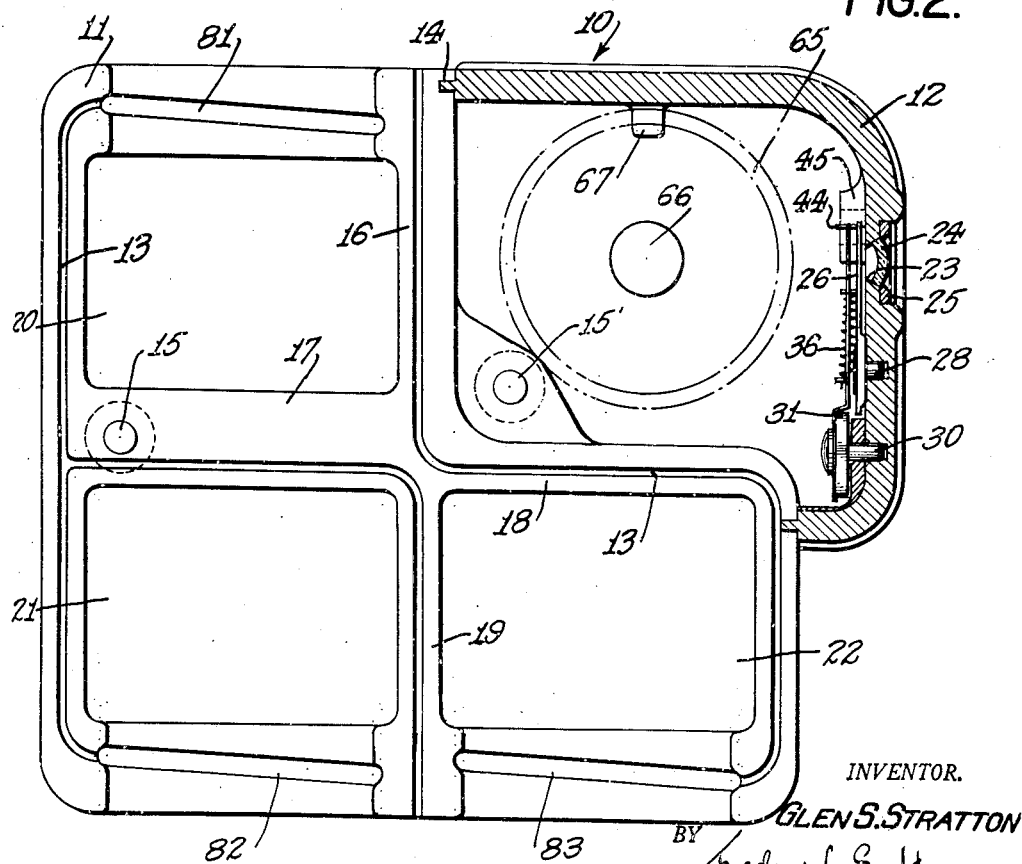
Fig. 2 is an elevational side view of the camera on an enlarged scale, part of the camera casing being removed and another part of the camera casing being shown in section.

The conventional shutter, as shown on Figs. 2 and 3, comprises a shutter disc 26 in which is provided an elongated slot 27. This slot is so positioned that it will be in alignment with lens 24 in certain positions of disk 26, thereby permitting the entrance of light through lens 24. Shutter disc 26 is pivoted about a pivot 28 supported in a corresponding opening in the front wall of casing section 12. The pivotal position of the shutter disk is controlled by an actuator frame 29 pivotal about a pin 30 also supported in a corresponding opening of a wall of casing section 12. Mounted on pin 30 and fastened to frame 29 is a block 31 which has two triangular recesses 32 and 33 as can be best seen on Fig. 3. The opposite side of block 31 has a flattened portion 34 slanted at both ends toward the periphery of block 31, as can be best seen on Fig. 3. The flattened side of block 31 is constructed and positioned to coact with the edge of a rib 35 fastened to or integral with the front wall of casing section 12. The slanted portions of flattened block portion 34 serve to determine two limit positions of frame 29, one limit position of the frame being caused by the upper slanted portion of portion 34 and the other element position by the lower slanted portion of portion 34. Frame 29 is shown in its left hand limit position (when viewed as shown on Fig. 3). Frame 29 and shutter disk 26 are joined by a loaded spring 36 fastened to shutter disk 26 and frame 29 respectively. The angular movement of shutter disk 26 is limited by two stops 37 and 38 provided on the front wall of casing section 12. Spring 36 serves to move shutter disk 26 from one limit position into the other when frame 29 is moved from one limit position into the opposite one. Spring 36 is so positioned and loaded that it will permit a certain angular movement of frame 29 without causing a corresponding movement of shutter disk 26 and then snap the shutter disk from one position to the other, thereby effecting a definite time of exposure through slot 27.

The rotation of frame 29 and disk 26, or in other words, the tripping of the shutter, are controlled by means of a push button 39 slidably supported in the front wall of casing section 12. A loaded coil spring 40 urges push button 39 into its outer position as shown on Fig. 3. The end of the push button extended into casing section 12 is pivoted to a pin release 41 by means of a pivot 42. The edge of pin release 41 abuts against a rib 43 of casing section 12, thereby holding push button 39 in its position against the action of spring 40. The pin portion of release 41 coacts with recesses 32 and 33 of block 31 and slides against a slanted surface of one of these recesses when bush button 39 is actuated. As a result, frame 29 and with it disc 26 will be forced into one or the other limit position depending upon which recess 32 or 33 is engaged. It will be noted that each pushing of push button 39 will result in one exposure.

To effect a snappy action of the shutter, a wire spring 44 is provided which is fastened at one end to a projection 45 of casing section 12 and engages at its free end a notch 46 of disk 26. Frame 29 has two noses 47 and 48 which serve to lift spring 44 out of this notch after a certain travel of frame 29, thereby supporting the action of spring 36.

The film on which the exposure is to be made, is inserted in casing section 12 by means of a cartridge generally designated by 50.

In this connection it should be noted that the invention is described herein in connection with the use of film but the invention is also applicable to positive print paper or to plates. The term "film," as used herein, is intended to refer to any sensitized layer as employed in the related art.

Cartridge 50 comprises a locating or securing knob 51 made of any suitable material such as plastic and provided at its outside with a wide thread 52. Knob 51 supports a spindle 53 mounted rotatably within knob 51. A selector knob 54 fastened to spindle 53 serves to rotate the spindle relative to knob 51. Suitable locking means are preferably provided to limit rotation of spindle 53 to one direction. Such means may comprise a ratchet-notch arrangement or as shown a coil spring 55 loosely fitted upon the spindle. One end of the coil engages a recess 56 of knob 51 so that rotation of the spindle in one direction will cause the coil to tighten, thereby preventing a rotation of the spindle in this direction, while the coil remains loose upon rotation of the spindle in the opposite direction. Spindle 53 supports a film carrier 57 made of any suitable material such as plastic and tightly fitted upon or otherwise secured to spindle 53 so that it will rotate with the same. Carrier 57 has preferably a polygonal cross section, as can best be seen on Fig. 5. The number of the sides of the polygon are determined by the number of pictures which it is intended to take with one cartridge. Fig. 5 shows a polygon having nine sides. Each side corresponds to one frame of a film 58. It will of course be evident that a greater or small number of sides may be provided. Under certain circumstances, it will even be satisfactory to use a film carrier having a circular cross section. Each of the carrier sides is preferably slightly recessed, as clearly shown on Fig. 5, so that a film placed upon the carrier rests only upon the edges between two adjoining carrier sides.

Any practical film size may be used, such as standard 8, 16 or 35 mm. film or fractions thereof. An appropriate length of the film is placed upon the film carrier and secured thereon by any suitable means. According to the embodiment shown, a narrow axial slot 57' is provided in the film carrier in which the two ends of film strip 58 are tightly fitted and secured, if necessary, by a drop of cement or by a small wedge 58' squeezed into slot 57'. This wedge can be pulled out when the film is removed and re-inserted when the cartridge is reloaded, thereby permitting repeated use of a cartridge.

The carrier and film placed thereupon is surrounded by a shroud 59 made out of metal or plastic. The shroud has an axial slot 60 the width of which is equal to one of the sides of the polygon. As can best be seen on Fig. 5, the shroud is positioned slightly eccentrically relative to the spindle axis so that only its edges 61 and 62 rest tightly against the film to prevent entrance of light between the shroud and the film and so that scuffing of the film is avoided when the spindle is rotated within the shroud. Edges 61, 62 are slightly rounded, as shown, or may be lined to protect the sensitive film.

The upper and the lower end of shroud 59 are fastened in corresponding recesses of end plates 63 and 64 which are loosely fitted upon spindle 53. As will be noted, end plates 63 and 64 together with shroud 59 form a housing for the film carrier preventing the access of light to the film except as to the portion of the film in alignment with shroud slot 60.

The cartridge, as previously described and best shown in Fig. 4, is preferably assembled and loaded in the factory. It will be apparent, that the cartridge can be handled in daylight after having been assembled. During the assembly, the spindle is placed in a position in which the joined ends of the film are in alignment with slot 60. This position may be described as the neutral or zero position of the film carrier.

When it is now desired to take pictures, the entire cartridge is inserted into a corresponding threaded opening 65 of section 12 and knob 51 is rotated until the cartridge is tightly fitted into opening 65. There is preferably provided a boss 66 for spindle 53 at the wall of section 12 opposite to opening 65. To secure shroud slot 60 in a position facing lens 24, suitable locking means are provided such as a locating lug 67, at the top wall of section 12 which engages a corresponding recess 68 in end plate 63.

The film carrier is now rotated by means of knob 54 until the first unexposed film portion adjacent to the portion including the joined film ends is in alignment with slot 60. To insure the correct adjustment of the film carrier, digits 1 to 8 are provided on knob 54, as can best be seen on Fig. 1. These digits coact with a stationary mark 71 on knob 51. After eight exposures, as provided in the illustrated embodiment, the film carrier is returned into the zero position, and the cartridge can now be safely removed in daylight.

The exposed film can be developed without requiring any manipulation of the cartridge or the use of a dark room, by simply immersing the entire cartridge, as it is, into conventionally used chemicals such as developing fluid, fixing fluid usually referred to as hypo, and by rinsing in water. It will of course be understood that the usual precautions as to temperature and time have to be taken as is conventional in the art.

The term "developing liquid or solution" as herein sometimes used, is intended to refer to all liquids conventionally used during the developing process.

For the purpose of circulating developing liquid in contact with the film while the same is on film carrier 57 and surrounded by shroud 59, each of end plates 63 and 64 is provided at its side facing the film with suitably positioned and connected channels. As can best be seen on Fig. 6, these channels may comprise an annular channel 72 from which radiate a number of channels 73 and an entrance channel 74.

To block the access of light, film carrier 57 is provided at both ends with annular fins 75 and 76 respectively which engage the corresponding channel 72, thereby acting as light seals.

As will be apparent from Fig. 6, liquid can flow into contact with the film while light is blocked by the curvature of the channels and the light seals.

The chemicals required for the development of film are preferably stored as two differently colored pellets 77 and 78 in a hollow portion 79 of spindle 53. These pellets may be included in a paper bag 88 which may be ripped open by means of a perforated strip. The spindle opening may be closed by a strip of adhesive paper 80 which is removed when it is desired to use the pellets.

The cartridge with exposed film can either be placed in a special developing tank or the developing process can be completed in the camera casing 10 proper.

As previously mentioned, casing 10 includes three chambers 20, 21 and 22. Each of these chambers is accessible through a threaded opening 81, 82, and 83 respectively. These openings are designed to receive knob 51 of cartridge 50. When it is desired to develop the exposed film, one of the chambers, say chamber 20, is partly filled with water and the pellet containing the developer is dissolved in the water. Thereupon, the cartridge is inserted by tightening knob 51 without turning spindle knob 54. After the time usually required for development, the cartridge is placed in the chamber, say chamber 21, containing rinsing water, and finally into chamber 22 containing the hypo. A second rinsing of the film can be performed in chamber 21 or in any other source of water.

The chemicals stored in the pellets should be selected so that they are just sufficient for one developing process.

After the completion of the developing process, the cartridge is opened by knocking off end plate 63 and removing shroud 59.

Any opening which is not used is preferably closed by knobs 84, 85, 86 as best can be seen on Fig. 1.

It will of course be understood that the photographic camera can be provided with the usual accessories and attachments such as a view finder 87.

While the invention has been described in detail with respect to a certain now preferred example and embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A cartridge for supporting a sensitized layer comprising a knob-shaped collar, a polygonal carrier constructed to support the sensitized layer rotatably supported by said collar, a shroud surrounding the wall of said carrier, said shroud having an opening exposing a predetermined portion of a sensitized layer placed on the wall of said carrier for exposing successive portions of the sensitive layer by rotation of the carrier within the shroud, each side of said polygonal carrier corresponding to one of said layer portions, and an upper and a lower end plate supported by the carrier and joined with said shroud to constitute a housing encasing the carrier, each of said end plates having channels facing the carrier for admitting liquid into contact with the sensitized layer while blocking the access of light to the said layer portions.

2. A cartridge for supporting a sensitized layer comprising a collar arranged to be fitted into a corresponding opening, a carrier constructed to support a sensitized layer upon its wall and rotatably supported by the collar, a knob for manually rotating the carrier, a shroud surrounding the wall of said carrier and having an opening exposing a predetermined portion of a sensitized layer placed on the wall of said carrier for exposing successive portions of the layer by rotation of the carrier within the shroud, and an upper and a lower end plate joined with said shroud to constitute a housing encasing said carrier, said housing being rotatably supported by the carrier, each of said end plates including channels facing the carrier for admitting liquid into contact with the sensitized layer while blocking the access of light to the said layer.

3. A cartridge as described in claim 1 wherein said shroud is mounted eccentrically to the carrier so as to engage the sensitized layer along the edges of the shroud opening while leaving a clearance between the shroud walls and the layer portion covered by the shroud, thereby effecting a light seal at the shroud opening and preventing scuffing of the sensitized layer.

4. A cartridge for supporting a sensitized layer comprising a knob-shaped collar arranged to be fitted into a corresponding opening, a spindle rotatably mounted within the collar, a knob for manually rotating said spindle, a polygonal carrier for supporting a sensitized layer on its wall fastened to said spindle for rotation in unison therewith, a shroud surrounding the wall of said carrier and having an opening exposing a predetermined portion of the sensitized layer for exposing successive portions of the said layer by rotation of the spindle of the carrier within the shroud, and an upper and a lower end plate joined with said shroud to constitute a housing encasing the carrier, said housing being rotatably supported on the carrier, at least one of said end plates having channels facing the carrier for admitting liquid into contact with the sensitized layer while blocking the access of light to the said layer.

5. A cartridge as described in claim 4, wherein said carrier has a rib at each of its flat sides extended into the channel of the respective end plate to form a light seal.

6. A cartridge as described in claim 2, wherein said carrier has a recess at its end distal to the collar for storage of developing material.

7. A cartridge as described in claim 2, wherein said carrier has a polygonal cross section, each facet of said polygon being recessed so as to cause the sensitized layer to rest upon the edges between each two adjoining facets.

8. A cartridge for supporting a sensitized layer comprising a knob-shaped collar, a carrier constructed to support the sensitized layer on its wall and rotatably supported by said collar, and a housing surrounding said carrier and having an opening in a wall facing the sensitized layer on the carrier for exposing successive portions of the sensitized layer by rotation of the carrier, within the housing, said housing including internal channels for admitting liquid into contact with the sensitized layer while blocking the access of light to the said layer portions.

9. A cartridge as described in claim 2, wherein one of the channels of each end plate is annular and wherein the other channels are radially extended substantially to the point at which the respective end plate is joined to the shroud.

10. A cartridge as described in claim 4, in combination with one-way locking means between the spindle and the collar providing for rotation of the spindle relative to the collar in one direction and blocking rotation of the spindle in the opposite direction.

GLEN S. STRATTON.

REFERENCES CITED

The following references are of record in the file of this patent:

UNITED STATES PATENTS

| Number | Name | Date |
|---|---|---|
| 71,205 | Nicour | Nov. 19, 1867 |
| 901,202 | Sheppard | Oct. 13, 1908 |
| 1,424,816 | Grillone | Aug. 8, 1922 |
| 1,602,931 | Pope | Oct. 12, 1926 |
| 2,344,951 | Smith | Mar. 28, 1944 |
| 2,344,993 | Morgan | Mar. 28, 1944 |
| 2,410,327 | Berry | Oct. 29, 1946 |